United States Patent [19]

Rey et al.

[11] Patent Number: 5,211,928

[45] Date of Patent: May 18, 1993

[54] METHOD OF IMPROVING GYPSUM SLURRY FILTRATION IN THE PRODUCTION OF PHOSPHORIC ACID

[75] Inventors: Paul A. Rey, Coraopolis; Wood E. Hunter, Pittsburgh, both of Pa.

[73] Assignee: Calgon Corporation, Pittsburgh, Pa.

[21] Appl. No.: 775,888

[22] Filed: Oct. 15, 1991

[51] Int. Cl.$^5$ .............................................. C01B 25/16
[52] U.S. Cl. .................................. 423/321 R; 423/320
[58] Field of Search .............. 423/321 R, 321 S, 32 D

[56] References Cited

U.S. PATENT DOCUMENTS

| | | | |
|---|---|---|---|
| 2,266,954 | 12/1941 | Bonnet et al. | 423/321 R |
| 3,644,091 | 2/1972 | Naschke et al. | 423/321 R |
| 4,291,005 | 9/1981 | Poulos et al. | 423/321 R |
| 4,800,071 | 1/1989 | Kaesler et al. | 423/321 R |
| 5,009,873 | 4/1991 | Kerr et al. | 423/320 |
| 5,120,519 | 6/1992 | Gross | 423/320 |

FOREIGN PATENT DOCUMENTS

| | | | |
|---|---|---|---|
| 880214 | 9/1971 | Canada | 423/321 R |
| 1113922 | 5/1968 | United Kingdom | 423/321 R |
| 2047218 | 11/1980 | United Kingdom | 423/321 R |

OTHER PUBLICATIONS

Chemical Abstracts 83:181589 (1975).
Chemical Abstracts 86:123780 (1977).
Chemical Abstracts 91:195236 (1979).
Chemical Abstracts 96:8835 (1982).
Chemical Abstracts 99:214925 (1983).

*Primary Examiner*—Gregory A. Heller
*Attorney, Agent, or Firm*—W. C. Mitchell; C. M. Caruso

[57] ABSTRACT

A method for improving gypsum slurry filtration in the production of wet process phosphoric acid wherein an effective amount of carboxylic-type polymer having a portion of sulfonic functionality is used as the filtration aid. Preferred polymers are high molecular weight polymers of acrylic acid and acrylamido methylpropyl sulfonic acid.

4 Claims, No Drawings

METHOD OF IMPROVING GYPSUM SLURRY FILTRATION IN THE PRODUCTION OF PHOSPHORIC ACID

BACKGROUND OF THE INVENTION

The primary method of manufacturing phosphoric acid is by digestion of phosphate rock with acid. This is commonly referred to as the "wet" process for phosphoric acid production. Apatite (calcium phosphate) is the most commercially valuable phosphate mineral. Sulfuric acid is the most commonly used acid for digestion. A by-product of wet process phosphoric acid production is the generation of a significant amount of calcium and magnesium sulfates (commonly referred to as phosgyp), and to a lesser degree other impure precipitates. The insoluble solids are typically removed by filtration, usually on a horizontal pan filter. The solids are then discharged as a waste product and the filtered acid is concentrated by evaporators with a clarification process between each stage. The final acid concentration is determined by the end use and can be as high as 67 to 76% $P_2O_5$, which is known as superphosphoric acid. Fertilizer production accounts for about 90% of phosphate rock utilization.

After the phosphate matrix has been mined, it is beneficiated by washing, screening and/or flotation processes to concentrate the phosphatic material. The concentrated phosphate rock consists of phosphates of calcium, magnesium and the like with some organic as well as inorganic impurities. This material is dissolved by hot (140°-190° C.) sulfuric acid to yield a phosphoric acid solution of about 28% $P_2O_5$. The sulfuric acid reacts with the cations in the phosphatic ore matrix, producing insoluble precipitates. The bulk of the insoluble solids consists of sulfates of calcium and magnesium which are removed by filtration prior to subsequent concentration of the acid. The efficiency of the filtration stage directly impacts the cost effectiveness of phosphoric acid production. Increases of 5–10% in the filtration rate are considered to be economically attractive. Many plants operate with filters at capacity and this stage is the limiting factor in phosphoric acid production. Polymeric filter aids offer a means of increasing production without capital investment. While a number of flocculants have been reported in the literature to improve filtration and acid clarification, there are no references known to the inventors relating to the use of the instant acrylic acid/acrylamido methylpropyl sulfonic acid-type polymers to improve gypsum filtration.

U.S. Pat. No. 4,800,071 discloses the use of sulfonated acrylamide and sulfonated acrylamide/acrylate polymers to aid in the filtration of gypsum in the "wet" process for production of phosphoric acid.

Flocculants are often used to aid the clarification process. See, for example, U.S. Pat. No. 3,644,091, which discloses the use of water soluble sulfonated polystyrenes having molecular weights of from about 1 to about 40 million as phosphoric acid clarification aids.

U.S. Pat. No. 4,291,005 discloses the use of acrylamide/acrylate polymers for settling suspended solids in phosphoric acid product solutions. The improvement wherein said flocculating agent is a copolymer consisting essentially of a predominant portion of acrylic acid units.

CA86(18):123780 and CA99(12):903x relate to the effect of polyacrylamide on the filtration rate of phosphogypsum.

CA91(24):195236r discloses the effect of various polyacrylamides and polyethylene oxide polymers on the filterability of phosphogypsum.

By contrast, the present invention relates to the use of designated high molecular weight carboxylic acid-type polymers with a portion of sulfonic functionality as filtration aids to improve the dewatering of gypsum slurries in the manufacture of wet process phosphoric acid.

SUMMARY OF THE INVENTION

The instant invention is directed to the filtration of gypsum slurries in wet process phosphoric acid manufacture using designated carboxylic acid-type polymers with a portion of sulfonic functionality. More particularly, this invention is directed to an improved method of filtering gypsum slurries which is characterized by the addition of an effective amount of a polymer consisting essentially of carboxylic and sulfonic moieties. The disclosed flocculant, when effectively applied, improves solids retention on the filter media and liquid transport and generally facilitates the operation of the filter. The increased filtration rate translates into increased filter capacity. Furthermore, capture of the finely dispersed solids can be expected to improve the efficiency of subsequent clarification processes.

The instant filtration-aid is selected from a class of polymers which previously has not been used for this application. The preferred polymer is a copolymer of acrylate and a sulfonated monomer. These polymers should have a reduced viscosity of at least 0.5 dl/g as measured at 0.05% active polymer in 1 0 M NaCl. In general, sulfonated monomer is more expensive than acrylic acid and it is best to keep the content of the sulfonated portion as low as possible for cost effectiveness. The preferred sulfonated monomer for use in preparing the instant polymers is 2-acrylamido-2-methyl-propanesulfonic acid (AMPSA) which is commercially available from the Lubrizol Corporation. The term "acrylate" refers to acrylic members of the polymer which includes acrylate or methacrylate salts in the form of sodium, ammonium, potassium and the like and is not meant to limit the invention. In any case, in a strong acid environment, such as the one referred to herein, the salts added to the acid solution convert to the acrylic or methacrylic acid form.

The instant inventors have also discovered that the instant carboxylic/sulfonic-containing polymers have an affinity for the very fine black organics associated with phosphoric acid production. This family of compositions is very effective in flocculating and retaining the fine calcium solids and black organic solids on the filter.

DETAILED DESCRIPTION OF THE INVENTION

The instant invention is directed to a method for improving the filtration of a gypsum slurry in a wet process phosphoric acid manufacturing process, which method comprises adding an effective amount of a polymer consisting essentially of carboxylic acid and sulfonic acid moieties, or salts thereof, to said gypsum slurry.

More particularly, the carboxylic acid/sulfonic acid polymers of the instant invention consist essentially of about 0.5 to about 99.5%, by weight, of an unsaturated carboxylic acid selected from the group consisting of acrylic acid, methacrylic acid, their salts and mixtures thereof; and b) about 99.5 to about 0.5%, by weight, of an unsaturated sulfonic acid selected from the group consisting of 2-acrylamido-2-methylpropyl sulfonic acid, 2-methacrylamido-2-methylpropylsulfonic acid, vinyl sulfonic acid, sulfoalkyl acrylate, sulfoalkyl methacrylate, allyl sulfonic acid, methallyl sulfonic acid 3-methacrylamido-2-hydroxy-propyl sulfonic acid, sulfonic acid acrylate, their salts and mixtures thereof.

Preferably, the carboxylic acid/sulfonic acid-type polymers of the instant invention consist essentially of: a) about 10 to about 90%, by weight, of acrylic acid, methacrylic acid or salts thereof; and b) about 90% to about 10%, by weight, of a sulfonic acid selected from the group consisting of 2-acrylamido-2-methylpropyl sulfonic acid, 2-methacrylamido-2-methylpropyl sulfonic acid and salts thereof.

The most preferred polymers are believed to be polymers which consists essentially of: a) about 30 to about 70%, by weight, acrylic acid and b) about 70 to about 30%, by weight, 2-acrylamido-2-methylpropyl sulfonic acid.

The instant polymers may be prepared by conventional polymerization techniques. Such polymers are available from Calgon Corporation, Pittsburgh, Pa.

The instant polymers should have molecular weights of at least about 500,000, as determined by viscometry. Preferably, the instant flocculant polymers should have molecular weights of at least about 500,000, and polymers having molecular weights in excess of 5,000,000 are especially preferred.

An effective amount of the instant polymers should be used. As used herein, the term "effective amount" refers to that dosage of polymer, on an active basis, necessary to give the desired level of filtration in the system being treated.

The instant filtration aids should be added so as to provide a dosage in the range of from about 0.1 to about 500 ppm, based on active polymer weight and the total weight of gypsum slurry being filtered.

The instant polymers are generally added to a filter feed stream, though any conventional method of adding a filtration aid can be utilized, including the use of multiple feed points. The term "filter", as used herein, refers to any filtration device, including vacuum or gravity assisted devices, conventionally used in gypsum slurry dewatering. The most common device is a horizontal pan filter.

The inventors have found the instant polymers to be especially effective in the removal of insoluble organics from phosphoric acid streams. Such organics are naturally occurring constituents of the phosphate ore matrix.

These solids normally pass through the filter and end up in the final acid product. Removal of these solids at this stage improves clarity of the final acid concentrate and generally does not result in any loss of phosphate.

EXAMPLES

The following examples further demonstrate the instant invention. They are not, however, intended to limit the scope of the invention in any way.

EXAMPLES 1-40

Filtration tests were conducted of gypsum slurry samples obtained from the pan filter feed lines of a Florida wet process phosphoric acid plant. Samples were kept in heated baths to maintain temperature at 180° F.

Filtration rates were measured by drawing liquid out of the test slurries under vacuum through a filter media. A vacuum of 12 inches of mercury was used in tests for Tables I and II and 8 inches of mercury were used in tests for Tables III and IV. The time required to achieve a removal of 250 ml of filtrate from a 500 ml sample of slurry was recorded. In these examples, each grouping represents a fresh sample of slurry. In each table, results are reported in the order of evaluation. Results are shown in Tables I through IV. In these tables, AA is acrylic acid, AM is acrylamide and AMPSA is 2-acrylamido-2-methylpropyl sulfonic acid.

As shown in all of the examples, polymeric filtering aids generally improved the dewatering rate of the gypsum slurry. AA/AMPSA copolymers were more effective on a polymer basis than AM/AMPSA copolymers as shown in Table I (compare groups B and C to group A). Table II shows that copolymers which are predominantly AMPSA are the most effective dewatering aids. Another key aspect of use of AM/AMPSA copolymers versus conventional AA/AM technology is that the presence of AA/AM type polymers (as observed in Tables III and IV) tended to increase the viscosity of the slurry. Higher slurry viscosities have been often associated with a higher propensity for fluid retention. Therefore, additional phosphoric acid is lost with the filter cake. As shown in Table IV, the performance of AA/AM copolymers can be dosage sensitive and higher dosages for these polymers are often detrimental to filter performance.

TABLE I

| Group | Example No. | Composition | MW | Dosage* (mg/L) | Filtration Time (sec) |
|---|---|---|---|---|---|
| A | 1 | Untreated | — | 0.1 | 13.6 |
|  | 2 | (72/28 AM/AMPSA) | 8 MM | 5.1 | 9.2 |
|  | 3 | " | " | 7.7 | 12.8 |
|  | 4 | " | " | 2.6 | 17.8 |
| B | 5 | Untreated | — | 0.0 | 16.0 |
|  | 6 | (30/70) AA/AMPSA) | 6 MM | 5.8 | 10.2 |
|  | 7 | " | " | 2.6 | 11.7 |
|  | 8 | Untreated | — | 0.0 | 17.1 |
| C | 9 | Untreated | — | 0.0 | 15.6 |
|  | 10 | (72/28) AA/AMPSA | 6 MM | 10.0 | 13.5 |
|  | 11 | Untreated | — | 0.0 | 16.8 |
|  | 12 | (31/69) AA/AM | 15 MM | 5.0 | 12.6 |
|  | 13 | " | " | 2.5 | 19.3 |
|  | 14 | Untreated | — | 0.0 | 25.0 |
| D | 15 | Untreated | — | 0.0 | 11.4 |
|  | 16 | (72/28) AM/AMPSA | 8 MM | 5.1 | 8.0 |
|  | 17 | (30/70) AA/AM | 6 MM | 5.7 | 8.7 |
|  | 18 | (72/28)AA/AMPSA | 6 MM | 5.1 | 8.0 |

*"Active Polymer" basis

TABLE II

| Example No. | Composition | MW | Dosage* mg/L | Filtration Time (sec) |
|---|---|---|---|---|
| 19 | Untreated | — | 0.0 | 20.7 |
| 20 | (30/70)AA/AMPSA | 6 MM | 5.8 | 14.6 |
| 21 | (72/28)AM/AMPSA | 8 MM | 5.1 | 16.5 |
| 22 | (72/28)AA/AMPSA | 6 MM | 5.1 | 19.5 |
| 23 | Untreated | — | 0.0 | 28 |

*"Active Polymer" basis

TABLE III

| Example No. | Composition | MW | Dosage* mg/L | Filtration Time (sec) |
|---|---|---|---|---|
| 24 | Untreated | — | 0.0 | 144 |
| 25 | (30/70)AA/AMPSA | 6 MM | 11.6 | 32 |
| 26 | (50/50)AA/AMPSA | 6 MM | 12.0 | 33 |
| 27 | Untreated | — | 0.0 | 138 |
| 28 | (31/69) AA/AM** | 15 MM | 10.0 | 50 |

*"Active Polymer" basis
**Observed increased slurry viscosity which generally leads to higher fluid retention in filter cake.

TABLE IV

| Example No. | Composition | MW | Dosage* mg/L | Filtration Time (sec) |
|---|---|---|---|---|
| 29 | (50/50)AA/AMPSA | 6 MM | 12.0 | 43 |
| 30 | Untreated | — | 0.0 | 130 |
| 31 | (50/50) AM/AMPSA | 8 MM | 5.1 | 57 |
| 32 | " | " | 10.3 | 55 |
| 33 | " | " | 20.6 | 65 |
| 34 | (30/70)AM/AMPSA | 8 MM | 5.3 | 80 |
| 35 | " | " | 10.7 | 48 |
| 36 | " | " | 21.4 | 39 |
| 37 | (31/69)AA/AM** | 15 MM | 5.0 | 72 |
| 38 | " | " | 10.0 | 37 |
| 39 | " | " | 20.0 | 68 |
| 40 | Untreated | — | 0.0 | 124 |

*"Active Polymer" basis
**Observed an increase in slurry viscosity with increasing polymer dosage.

When an AA/AMPSA type polymer is added and mixed into the slurry, the slurry changes from a uniform dark grey appearance to a "salt and pepper" appearance as the floc forms, leaving small specks of flocced black "organic" particles mixed in with the light colored gypsum.

As a result, the organics are captured into the slurry cake, and do not pass through into the filtrate, so that polymer treated filtrate is much cleaner than the untreated filtrate.

What is claimed is:

1. A method for improving the filtration of a gypsum slurry in a wet process phosphoric acid manufacturing process which comprises adding to a said gypsum slurry an effective amount of a polymer which consists essentially of about 0.5 to about 99.5%, by weight, of: a) an unsaturated carboxylic acid selected from the group consisting of acrylic acid, methacrylic acid, their salts and mixtures thereof; and b) about 99.5 to about 0.5%, by weight, of an unsaturated sulfonic acid selected from the group consisting of 2-acrylamido-2-methylpropyl sulfonic acid, 2-methacrylamido-2-methylpropyl sulfonic acid vinyl sulfonic acid, sulfoalkyl acrylate, sulfoalkyl methacrylate, allyl sulfonic acid, methallyl sulfonic acid, 3-methacrylamido-2-hydroxypropyl sulfonic acid, sulfonic acid acrylate, their salts and mixtures thereof.

2. The method of claim 1, wherein said polymer consists essentially of: a) about 10 to about 90%, by weight, acrylic acid; and b) about 90 to about 10%, by weight, 2-acrylamido-2-methylpropyl sulfonic acid, and wherein said polymer has a molecular weight of at least about 500,000.

3. The method of claim 2, wherein said polymer consists essentially of: a) about 30 to about 70%, by weight, acrylic acid and b) about 70 &o about 30%, by weight, 2-acrylamido-2-methylpropyl sulfonic acid.

4. The method of claim 2, wherein said effective amount is from about 0.1 to about 500 ppm, on an active polymer basis, based on the weight of said gypsum slurry.

* * * * *